April 23, 1957 R. J. FREITAS 2,789,388
FISHING APPARATUS
Filed Jan. 24, 1956

INVENTOR.
ROBERT J. FREITAS
BY J. F. McLillan
ATTORNEY

United States Patent Office 2,789,388
Patented Apr. 23, 1957

2,789,388

FISHING APPARATUS

Robert J. Freitas, San Diego, Calif.

Application January 24, 1956, Serial No. 561,041

7 Claims. (Cl. 43—43.16)

The present invention relates to fishing apparatus and more particularly to a fishing hook which is adapted to automatically release a hooked fish.

At the present state of the art it is common practice to catch comparatively large fish such as tuna through the use of a conventional hook or "squid" secured to the end of a line which is carried in the usual manner by a fishing rod, the hook being manually deployed into and out of fishing position through manipulation of the rod. In recent years various attempts have been made to automatize or mechanize this procedure, and a desirable adjunct to any such mechanized method of deployment of the fishing hook is an automatic means for effecting the release of the hooked fish. More particularly, assuming that the fishing hook has been cast into the water, that a fish has been hooked, and that automatic means have been actuated whereby the hooked fish is brought into a position for unhooking, it will be apparent that much of the value of the automatic fishing method would be lost if the fish had to be unhooked manually. Such a manual expedient would be particularly disadvantageous where many fishing hooks were required to be in constant operation, as for example aboard a large tuna clipper in the midst of an active or "hot" school of fish.

In accordance with the present invention there is provided a fishing hook which is normally biased to engaging or operative position, but which is actuable to disengaging or inoperative position by the out-of-water weight of a fish acting upon the hook. The fishing hook of the present invention includes a member which is movable within a fluid filled container in response to the weight of the fish, the rate of movement of the member being controlled by the action of fluid flow regulating means so that the hook element, which is operatively coupled to the member, cannot move to disengaging position until a sufficient period of time has elapsed, as dictated by the flow regulating means. Bias means are provided to move the hook element to engaging position immediately after the fish has been unhooked.

It is therefore an object of the present invention to provide an improved fishing hook which is adapted to automatically release a hooked fish.

Another object of the invention is the provision of a novel self-releasing fishing hook which is adapted to release a hooked fish after the elapse of a predetermined period of time.

It is another object of the invention to provide a unique self-releasing fishing hook which is mechanical in operation.

An additional object of the invention is the provision of a novel fishing hook which is adapted to automtically move to fish unhooking position after a certain time interval, and which is also adapted to move to fish hooking position within a lesser time interval.

A still further object of the present invention is to provide an improved self-releasing fishing hook which is relatively impervious to corrosion, simple in operation, and economical to manufacture.

Other objects and features of the present invention will be readily apparent to those skilled in the art from the following specification and appended drawings wherein are illustrated embodiments of the invention, and in which.

Figure 1:
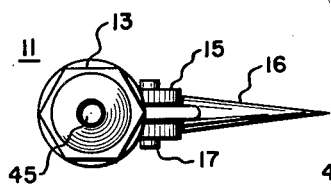
Figure 1 is a plan view of one embodiment of the fishing hook of the present invention.
Figure 2:
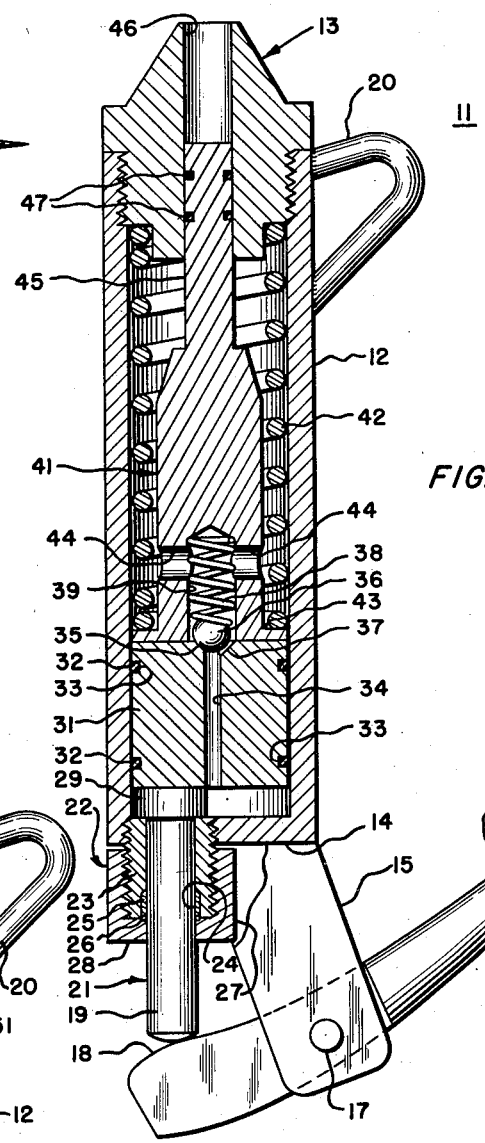
Figure 2 is a side elevational view, partially in section and on an enlarged scale, of the embodiment of Figure 1.

Referring to the drawings and more particularly to Figures 1 and 2, there is illustrated an embodiment of a fishing hook according to the present invention which is generally designated 11, and which is particularly adapted for use with automatic systems for deploying a fishing hook into and out of fishing position, hook 11 being adapted for attachment to the end of a conventional fishing line, or the like by means of a fitting 20. However, the successful operation of hook 11 is not predicated upon the use of any particular automatic system, nor does any such system form a part of this invention, and, accordingly, no detailed description of any such system will be made.

Hook 11 comprises a cylindrical body or housing 12 which is filled with a fluid such as hydraulic oil and which is closed at its upper end by a threaded nut or plug 13, and at its lower end by an integral wall or base 14. Plug 13 is preferably threaded in position to permit assembly and disassembly of the parts enclosed by housing 12, as will be described, and base 14 carries a hook support 15, support 15 being rigidly secured to base 14, as by welding or the like.

A hook member 16 is pivotally secured to support 15 by a pivot pin 17, the outward end of hook member 16 being sharpened for the hooking of fish, and the inward end of member 16 being provided with a camming surface 18 which is adapted for slidable association with a lower end 19 of a rod element 21 which is vertically slidable into and out of housing 12. With this construction, pivotal movement of hook member 16 downwardly, for example, will effect a corresponding vertical movement upwardly of rod element 21.

Rod element 21 is slidably carried by a sealing means or packing 22 which includes a stud member 23 which is threadably secured to housing 12 through a suitably threaded opening in base 14 of housing 12. Stud member 23 embodies an internal bore 24 which is filled in its upper portion by a cylindrical band 25 of a soft material such as lead, bore 24 being filled in its lower portion by a circular ring 26 of a hard material such as steel. Ring 26 protrudes downwardly outside of stud member 23, and both ring 26 and band 25 are disposed in close-fitting relationship with rod element 21. A nut 27 also forms a portion of packing 22, and is adapted to be fitted over lower end 19 of rod element 21 and threaded onto stud member 23. Nut 27 embodies an inwardly disposed annular flange 28 which bears up against ring 26 upon tightening of nut 27 so that ring 26 is urged against the soft band 25. Band 25 deforms into tight fitting and sealing relation with element 21 to thereby prevent the leakage of any fluid from housing 12 past element 21.

The upper end or head portion 29 of rod element 21 abuts against, but is preferably not secured to, the underside of a control member or piston 31 which is slidably carried within housing 12 so that vertical movement of element 21 effects a vertical sliding movement of piston 31. Piston 31 carries a pair of usual O rings 32 within peripheral grooves 33 to prevent any flow of fluid past the periphery of piston 31 during movement thereof. Instead, fluid flow is channeled through a central bore or orifice 34 of piston 31, the diameter of orifice 34 serving to control the rate of downward movement of piston 31.

Orifice 34 is enlarged at its upper end to form a valve seat 35 for a usual ball check valve 36 which prevents free flow of fluid through orifice 34 during upward movement of piston 31. Instead, the rate of upward movement is regulated by the fluid flow through a small groove or passageway 37 which is cut into valve seat 35 and which provides communication between orifice 34 and the upper surface of piston 31 even when check valve 36 is in seated or closed position. It will be apparent that for a given quantity of fluid the sizes of orifice 34 and orifice or passageway 37 may be chosen to produce a particular desired rate of movement of piston 31 downwardly and upwardly, respectively, it being noted that in the present invention the size of passageway 37 is made much smaller than the size of orifice 34 so that the upward movement of piston 31, and consequent downward movement of hook member 16, is considerably slower than the downward movement of piston 31. In this manner hook member 16 will slowly descend to release a hooked fish, but will quickly return to its upward or operative position after the fish has dropped off hook member 16.

Check valve 36 is urged into seated position by a spring 38 which is carried within a bore 39 of a spring guide 41, guide 41 in turn being urged against piston 31 by a spring 42 which exerts its bias against plug 13 and against a peripheral flange or base 43 of guide 41. In addition, horizontal bores 44 are provided in guide 41 in communication with bore 39 so that a fluid passage is provided between orifice 34 and the exterior of spring guide 41. It will be apparent that with this construction piston 31 will normally be urged to its downward position by spring 42, with fluid flowing upwardly through orifice 34 and thence through bores 44, until head portion 29 of rod 21 comes into contact with stud member 23.

To permit upward movement of piston 31 it is to be observed that volume compensation means must be provided to compensate for the volume of the inwardly moving rod element 21. Accordingly, spring guide 41 carries an integral upper rod portion 45 substantially equal in diameter to the lower end 19 of rod element 21, rod portion 45 being vertically slidable through a central bore 46 provided in plug 13. Rod portion 45 is closely fitted to bore 46 and is provided with a pair of usual O rings 47 to reduce fluid leakage.

Figure 3:
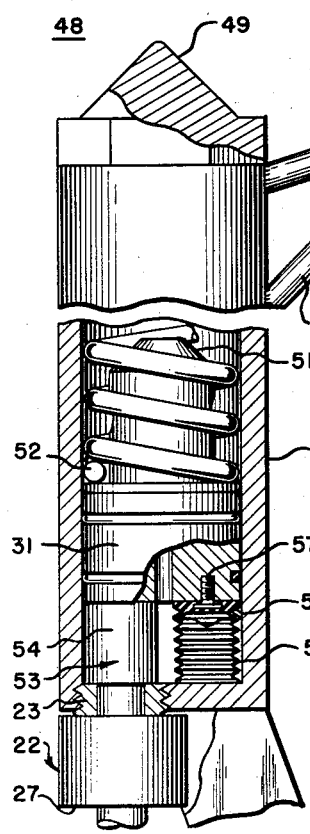
Figure 3 is a side elevational view, partially in section and on an enlarged scale, of a second embodiment of the present invention.

A different volume compensation means is provided in a second embodiment or hook 48 of the present invention, as illustrated in Figure 3. This second embodiment is substantially identical to the first embodiment except that central bore 46 of plug 13 of the first embodiment or hook 11 has been eliminated, as illustrated, to prevent any possibility of fluid leakage through bore 46, and a solid plug 49 is provided instead. Likewise, a modified spring guide 51 is employed which does not embody a rod portion 45, and a spring 52 of shorter length than spring 42 is used to enable piston 31 to be normally located somewhat higher than was the case with hook 11. In addition, a rod element 53 is employed which is characterized by a higher or longer head portion 54 which thereby serves to normally locate piston 31 in the higher position mentioned above. The greater space made available beneath piston 31 provides room for a usual bellows 55 which may be secured to the base of housing 12 or to the underside of piston 31 in any suitable manner, as by providing bellows 55 with an integral mounting block 56 made of rubber or the like which may be provided with an integral, molded in stud or bolt member 57 which is adapted for threadable securement to piston 31, as illustrated.

Bellows 55 is hermetically sealed and made of approximately the same volume as that volume of rod element 53 which will have entered housing 12 after the farthest upward travel of rod element 53 whereby bellows 55, which is made of resilient material such as rubber or the like, will be adapted to collapse as rod element 53 moves upwardly to thereby effect the desired volume compensation. It will be apparent that bellows 55 can, for this purpose, be constructed also of materials such as stainless steel, provided that the construction thereof permits expansible and collapsible movement of bellows 55. Stainless steel or the like material is also preferably employed in the fabrication of other components of the present invention in order to enjoy corrosion resistance, particularly in those areas which may be directly exposed to salt water, such as housing 12.

In operation both hook 11 and hook 48 behave in almost identical fashion, the weight of the hooked fish serving to move hook member 16 downwardly, with this downward movement being made to occur as slowly as desired through the employment of a predetermined size of passageway 37 whereby the fish will slide off hook member 16 after the elapse of a certain period of time. Rate of return of member 16 to its normal or operative position is then dictated by the size of orifice 34. It is of course recognized that the quantity of fluid, that is, the size of the fluid reservoir, may also be chosen to effect a particular rate of movement of hook member 16.

While certain preferred embodiments of the invention have been specifically disclosed, it is understood that the invention is not limited thereto as many variations will be readily apparent to those skilled in the art and the invention is to be given its broadest possible interpretation within the terms of the following claims:

What is claimed is:

1. A fishing hook comprising an element adapted to hook a fish, means mounting said element for movement from a hooking position to an unhooking position in response to the weight of a hooked fish, means operatively connected to said element and adapted for regulating the rate of said movement, and means for urging said element to hooking position.

2. A fishing hook comprising an element adapted to hook a fish, means mounting said element for movement between a hooking position and an unhooking position, said element being adapted for movement to unhooking position in response to the weight of a fish, a control member operatively coupled to said element and movable in response to movement of said element, means for regulating movement of said control member to thereby control movement of said element, and bias means for urging said element to hooking position.

3. A fishing hook comprising a fluid filled housing, a hook element, means mounting said hook element to said housing for movement of said hook element between a fish engaging position to a fish disengaging position, and control means coupled to said hook element and movable within said housing, said control means including orifice means to regulate the rate of movement of said control means to thereby regulate the rate of movement of said hook element.

4. Fishing apparatus comprising a fluid filled body, an engaging element carried by said body and actuable for movement between an engaging position and a disengaging position, control means movable within said body and including a first orifice means for regulating the rate of movement of said control means in a first direction and a second orifice means for regulating the rate of movement of said control means in a second direction, and means for coupling said control means and said engaging element whereby the rate of movement of said engaging element toward disengaging position is regulated by said first orifice means and the rate of movement of said engaging element toward engaging position is regulated by said second orifice means.

5. Fishing apparatus comprising a fluid filled body, an engaging element carried by said body and actuable for movement between an engaging position and a disengaging position, control means movable within said body and including a first orifice means for regulating the rate of movement of said control means in a first direction and a second orifice means for regulating the rate of movement of said control means in a second direction and valve means for closing said second orifice means during movement in said first direction, and means for coupling said control means and said engaging element whereby the rate of movement of said engaging element toward disengaging position is regulated by said first orifice means and the rate of movement of said engaging element toward engaging position is regulated by said second orifice means.

6. A fishing hook comprising an elongated fluid filled body, a hook element carried by said body and actuable for movement between a hooking position and an unhooking position, a piston member slidable within said body in fluid tight relation, said piston member embodying fluid passage means, a rod member operable upon said piston member and coupled to said hook element, said rod member being adapted for slidable movement into and out of one end of said body whereby movement of said hook element is regulated by said fluid passage means, and volume compensating means for permitting said movement of said rod member, said compensating means including rod means adapted for slidable movement into and out of the opposite end of said body in correspondence to said movement of said rod member.

7. A fishing hook comprising an elongated fluid filled body, a hook element carried by said body and actuable for movement between a hooking position and an unhooking position, a piston member slidable within said body in fluid tight relation, said piston member embodying fluid passage means, a rod member operable upon said piston member and coupled to said hook element, said rod member being adapted for slidable movement into and out of one end of said body whereby movement of said hook element is regulated by said fluid passage means, and volume compensating means for permitting said movement of said rod member, said compensating means including collapsible means in fluid relation with said body and whose volume is adapted to be varied in correspondence with the volume of said rod member within said body.

References Cited in the file of this patent
UNITED STATES PATENTS

| | | |
|---|---|---|
| 1,803,561 | Rodin | May 5, 1931 |
| 2,611,983 | Silva | Sept. 30, 1952 |
| 2,611,986 | Silva | Sept. 30, 1952 |